Feb. 20, 1968     E. B. CORNELIUS     3,369,859

PACKAGING SYSTEM

Filed Aug. 23, 1963

INVENTOR.
Edward B. Cornelius
BY John R. Ewbank

ATTORNEY.

3,369,859
PACKAGING SYSTEM
Edward B. Cornelius, Swarthmore, Pa., assignor to Air Products and Chemicals, Inc., Philadelphia, Pa., a corporation of Delaware
Filed Aug. 23, 1963, Ser. No. 304,090
1 Claim. (Cl. 21—61)

ABSTRACT OF THE DISCLOSURE

In packages in which trace amounts of oxygen are removed by catalytic combination with hydrogen (present as a minor constituent in the inert packaging gas), important advantages are achieved by using as the catalyst a cylindrical pellet of refractory oxide impregnated from an aqueous solution to provide from 0.1 to 1% palladium or platinum. Shielding means prevent the contents of the package from contacting the pellet.

---

Figure 1:
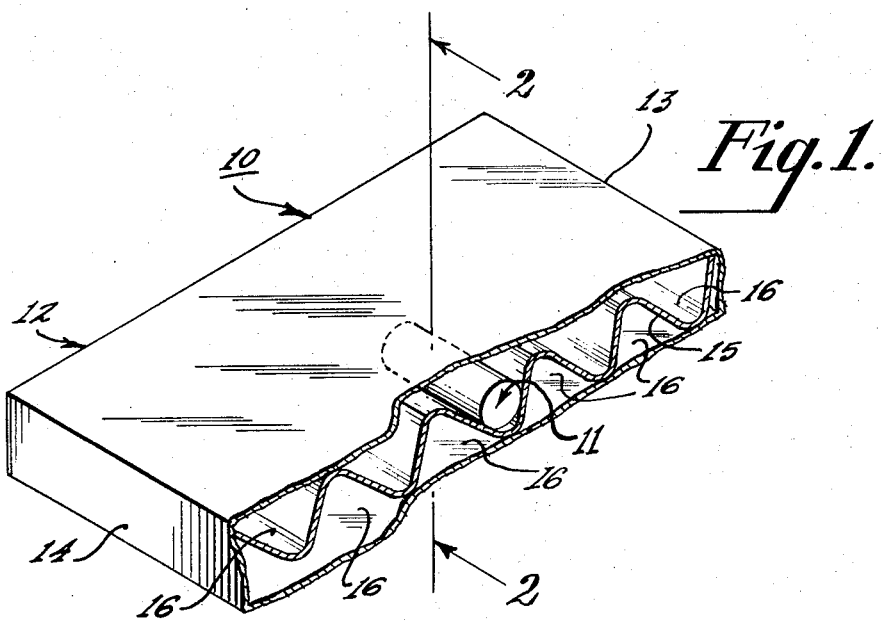

This invention relates to the method and apparatus for including an inert gas in a package of commodity desirably stored under non-oxidizing conditions. Foods, tobaccos, and flower seeds are among the products which are sometimes protected from oxygen during storage. This invention is concerned particularly with improvements adapted to consume any trace amounts of oxygen sorbed on the packaged goods or seeping into the package and/or otherwise entering the inert gas in the package subsequent to the initial purification of the inert gas, such consumption of oxygen being achieved by catalytic reaction with hydrogen to synthesize water at atmospheric temperatures by reason of the presence of a small amount of hydrogen in the inert gas and the presence of a water synthesis catalyst in the package.

For many years it has been known that certain goods deteriorate by reason of a slow reaction with oxygen. Containers featuring an inert gas prepared in such a manner as to contain less than 1% oxygen have been employed for many years to decrease such deterioration. Technologists in other fields discovered that oxygen in a concentration of a few parts per million could be removed from an inert gas by the utilization of hydrogen and a water synthesis catalyst adapted to promote the reaction of hydrogen and oxygen at a moderate temperature, and adapted to dissipate the heat of the water synthesis into the much larger volume of inert gas to avoid hot spots in the catalyst. One type of water synthesis catalyst has consisted of from about 0.1% to about 1% palladium on a sorptive alumina support. Rosenblatt 2,582,885 describes such a water synthesis catalyst for removing trace amounts of oxygen from technical grades of nitrogen. Linwald 2,789,059 describes one system for maintaining a low oxygen concentration in a warehouse by circulating an inert gas through a catalytic zone for a similar synthesis of water. British 734,197 suggests that a package featuring a water synthesis catalyst might prolong the shelf life of dried milk. Inasmuch as hydrogen and oxygen combine fairly readily above about 580° C., it is customary to use a catalyst for the reaction only when a lower temperature is desired, and the term "water synthesis catalyst" describes catalysts promoting the reaction at ambient temperature.

In accordance with the present invention, goods are packaged in a container together with a water synthesis catalyst prepared by impregnating a solution of a noble metal into a sorptive refractory support and thereafter drying the impregnated support to provide a catalyst containing from about 0.1 to about 1% noble metal of the class consisting of palladium and platinum on a sorptive refractory support. It is sometimes desirable to pretreat the catalyst with hydrogen to activate the metal prior to its use in the package comprising inert gas and hydrogen. In preferred embodiments of the invention, the water synthesis catalyst particle has significant crushing strength and minimum and maximum dimensions from about 1 to about 9 millimeters. A cylindrical pellet can serve, which pellet is positioned within a porous shell having a face area of from about 4 to about 40 square centimeters, said shell being a thin wafer adapted to prevent contact of the food with the catalyst pellet, but adapted to permit the permeation of gas to and from the catalyst pellet.

The nature of the invention is further clarified by reference to the accompanying drawings.

Figure 2:
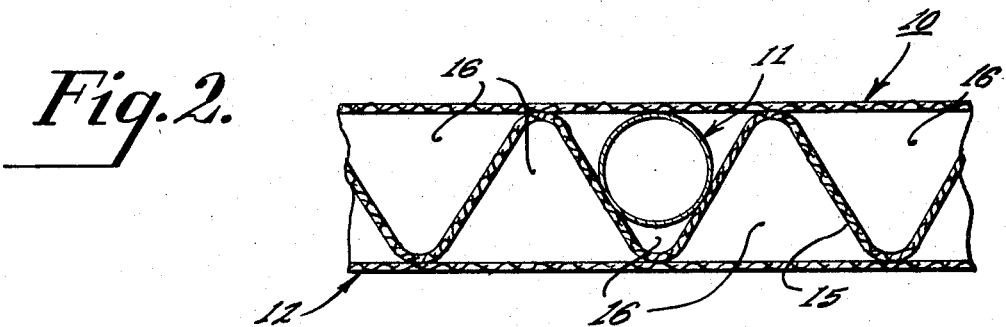
Figure 3:
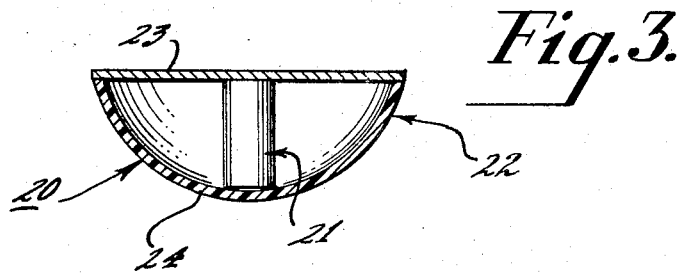

In the drawings, FIGURE 1 is a partially sectional, partially perspective view of one embodiment of a purifier. FIGURE 2 is a sectional view taken on line 2—2 of FIGURE 1. FIGURE 3 is a sectional view of an alternative embodiment of a purifier.

As shown in FIGURES 1 and 2, a purifier 10 may consist of a sorptive refractory pellet 11 and a porous shell 12 adapted to protect the surface of the pellet 11. The shell 12 consists of a small square (e.g., about 3 cm. per side) of corrugated boxboard having a facer 13 and liner 14 adhered to the corrugated medium 15, thereby defining a plurality of longitudinal flutes 16, in one of which the pellet 11 is snugly fitted. Gas can readily permeate to and from the pellet 11, which is protected from contact with food by the shell 12. Moreover, gas permeates readily through the paper of the corrugating medium 15 and/or facer 13 and liner 14, so that complete sealing of the ends of the flute 16 in which the pellet is fitted does not jeopardize the effectiveness of the purifier 10.

The ranges of from about 1 to about 9 mm. embraces the dimensions of all pellets of the present invention, one example of which may be a cylindrical pellet having a diameter of 4 mm. and a length of 6 mm. A sorptive refractory of the type generally employed as a catalyst carrier in chemical and/or petroleum industries is the most readily available carrier for any type of catalyst manufacture. Each particular species of catalyst generally benefits from a control of the manufacture from the initial selection of precursor to final heat treatment to meet the peculiar needs of the process in which the catalyst is employed. A preferred carrier for the water synthesis catalyst of the present invention is eta alumina derived from dehydration of high purity beta alumina trihydrate. The particles of eta alumina may be of any convenient size at the time of impregnation. Various types of silica-alumina and silica are also sorptive refractory oxides suitable for the impregnation procedure.

The sorptive refractory metal oxide particles are impregnated with an aqueous solution of a compound of the noble metal. Ordinarily, it is best to employ a halide compound such as chloroplatinic acid or, chloropalladic acid. The quantity of impregnating solution is desirably such that no excess remains after absorption of the impregnating solution. The concentration of the noble metal compound is adjusted so that the impregnated product contains approximately 0.1 to 1% of platinum or palladium. As an example, the pellet may be 0.1% palladium on sorptive eta alumina. The amount of noble metal in relation to the amount of goods protected in the package may be expressed as parts per trillion, or similar orders of magnitude.

In the alternative embodiment shown schematically in FIGURE 3, a purifier 20 includes a pellet 21 and a shell 22 consisting of a base 23 and a porous igloo-shaped dome 24, which may be constructed of a plastic foam such as polyurethane. Adhesives characterized by isocyanates are effective for adhering the base 23 to the lid or other portion of the container. The pellet 21 may be cylindrical, 3 mm. by 3 mm., consisting of 99.5% sorptive eta alumina and 0.5% platinum, with less than 0.1% halide, such as employed in naphtha reforming.

The wafer-like shell, whether of a type such as the boxboard shell 12 or of a type such as the foam plastic shell 22, has a relatively large surface area suitable for adhering the wafer to a container lid and/or for handling without transferring moisture on the fingers to the catalyst pellet. The face area of the wafer is at least 4 but less than 40 square centimeters. Thus, the large area of the wafer permits adhesion and handling which would not be feasible with the tiny pellet by itself.

The invention can be further clarified by reference to the following examples.

EXAMPLE I

A can having an atmosphere of an inert gas consisting of 96% cryogenically purified nitrogen and 4% hydrogen is directed to a filling zone in which the predetermined amount of powdered milk is placed in the can, thereby displacing excess inert gas, and the can having the inert gas above the powdered milk is directed to a lid placement zone, in which the lid is sealed onto the can.

In an alternative procedure, a predetermined amount of powdered milk is placed in a metal can having a circular lid and the can of powdered milk is directed to an inert gas lid placement zone. The air and/or other gas above the powdered milk is displaced by the stream of inert gas consisting of 96% cryogenically purified nitrogen and 4% hydrogen and the lid is placed on the can.

In either procedure, there is adhered to the lid a wafer consisting of corrugated boxboard containing a pellet of water synthesis catalyst prepared by impregnating chloropalladic acid into sorptive eta alumina and drying the impregnated pellet to provide a catalyst containing 0.1% palladium.

A group of sealed cans containing 4% hydrogen and 96% nitrogen above the powdered milk and a water synthesis catalyst is directed to storage and compared periodically with a group of similar containers characterized by the absence of catalyst pellets but otherwise identical. After one week of storage, an analysis of the gas in a can having no catalyst pellet shows the presence of several parts per thousand of oxygen, attributable possibly to gas absorbed on the particles of dried milk and not adequately removed in any of the gas flushing steps. However, a can containing the catalyst pellet contains no detectable amount of oxygen after such storage for one week. Moreover, each can containing catalyst is entirely free from oxygen even after storage for many months. Because the inert gas contains about 4% hydrogen, any trace amounts of oxygen desorbed from the particles of dried milk during prolonged storage is converted to water vapor as various portions of the gas, by random molecular movement, diffuse through the water synthesis catalyst. Moreover, flavor tests establish the effectiveness of the combination of cryogenically purified nitrogen and 3 to 5% hydrogen and the pellet of palladium on sorptive alumina catalyst for the retention of initial flavor during prolonged storage. Active forms of platinum can be substituted for palladium, but the effectiveness of the water synthesis catalyst at the concentration and temperature to be encountered in storage should be confirmed prior to use of such type of catalyst in a package.

EXAMPLE II

A series of noble metal catalysts are prepared and tested as water synthesis catalyst. A gas sample containing 0.1% oxygen, 4.9% hydrogen and 95% technical nitrogen is first directed through the catalyst sample being tested and then through a heat exchanger in a constant temperature bath and then into an instrument for measuring residual oxygen concentration by measuring the temperature rise in a control catalyst consisting of 0.5% palladium on gamma alumina.

Catalysts prepared by compositing metallic palladium powder with sorptive carrier (e.g., activated carbon, silica flour, etc.) have a low order of effectiveness. Catalysts prepared by adsorption of gaseous components (e.g., platinum carbonyl chloride) followed by hydrogen treatment also fail to achieve the rapid exhaustive elimination of oxygen. Only those catalysts prepared by impregnation of a solution of a noble metal compound into the sorptive carrier material, followed by drying to remove the liquid are effective (at the 0.1% noble metal concentration) in reducing the oxygen concentration to less than 1 p.p.m. at room temperature at a space rate of 400 volumes of gas per volume of catalyst per hour. Although it is desirable to treat the dried catalyst with gaseous hydrogen at a moderate temperature such as 150° C. prior to utilization of the catalyst for packaging, such pre-reduction is not essential for catalysts prepared by the impregnation technique. Several samples of commercially available supported noble metal catalyst were tested and found to be unsatisfactory for reducing oxygen concentration from 1000 to less than 1 p.p.m. at room temperature at a gas space rate of 400 v.v.h. at a noble metal concentration of 0.1%. A wide variety of catalysts prepared by the impregnation of a liquid solution of a compound of the noble metal into a sorbtive carrier having a surface area greater than 50 m.$^2$/g. consistently pass such minimum standards for a water synthesis catalyst.

Various modifications of the invention are possible without departing from the scope of the appended claim.

Among the noble metals, only palladium and platinum have adequate effectiveness in the water synthesis catalyst valuation test.

What is claimed is:

1. A sealed package containing goods and a controlled atmosphere having only trace amounts of oxygen and a volume of hydrogen significantly greater than the volume of oxygen, the trace amounts of oxygen being consumed by reaction with the larger volume of hydrogen in the gas of said controlled atmosphere, said package featuring the improvement which consists essentially of the combination of: an inert organic thin plate serving as a structural member having a face area of from 4 to 40 square centimeters; means for securing a cylindrical pellet to the plate so that a major portion of the area of the plate can be utilized as a gripping area; a cylindrical pellet of catalyst consisting of sorptive refractory oxide containing at least 0.1% but less than 1% noble metal of the group consisting of platinum and palladium, said catalyst pellet having both minimum and maximum dimensions of from 2 to 9 millimeters, said catalyst pellet having been prepared by impregnation of a pellet of sorptive metal oxide with a solution of a compound of the noble metal; guard portions serving as structural members extending from the plate and around the pellet, said guard portions tending to prevent the goods from contacting the pellet while permitting permeation of gas of said controlled atmosphere to and from the pellet; and said plate being secured within said package in such a manner as to normally permit said gas to permeate to said pellet.

References Cited

UNITED STATES PATENTS

| | | | |
|---|---|---|---|
| 2,408,164 | 9/1946 | Foster | 252—477 X |
| 2,582,885 | 1/1952 | Rosenblatt | 23—2 |
| 3,024,593 | 3/1962 | Houdry. | |
| 3,123,491 | 3/1964 | Beaumont | 99—189 X |
| 3,255,020 | 6/1966 | Ferrell | 99—189 |

FOREIGN PATENTS

| | | |
|---|---|---|
| 734,197 | 7/1955 | Great Britain. |

JAMES H. TAYMAN, JR., *Primary Examiner.*